(12) United States Patent
Wilson

(10) Patent No.: US 8,539,604 B2
(45) Date of Patent: Sep. 17, 2013

(54) METHOD, SYSTEM AND PROGRAM PRODUCT FOR VERSIONING ACCESS CONTROL SETTINGS

(75) Inventor: David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 1713 days.

(21) Appl. No.: 11/196,107

(22) Filed: Aug. 3, 2005

(65) Prior Publication Data

US 2007/0033654 A1 Feb. 8, 2007

(51) Int. Cl.
*G06F 7/04* (2006.01)
(52) U.S. Cl.
USPC .................................................... 726/27
(58) Field of Classification Search
USPC ............................... 726/27–30, 25, 26
See application file for complete search history.

(56) References Cited

U.S. PATENT DOCUMENTS

| | | | |
|---|---|---|---|
| 6,493,594 B1 | 12/2002 | Kraml | |
| 7,636,937 B1* | 12/2009 | Bhattacharya et al. | 726/2 |
| 2001/0011348 A1 | 8/2001 | Blumenau et al. | |
| 2002/0133491 A1* | 9/2002 | Sim et al. | 707/10 |
| 2003/0005093 A1 | 1/2003 | Deboer et al. | |
| 2003/0033590 A1 | 2/2003 | Leherbauer | |
| 2003/0101245 A1 | 5/2003 | Srinivasan et al. | |
| 2003/0158871 A1* | 8/2003 | Fomenko | 707/203 |
| 2003/0158919 A1 | 8/2003 | Fomenko | |
| 2004/0002960 A1 | 1/2004 | Drake et al. | |
| 2004/0034763 A1 | 2/2004 | McCardle | |
| 2004/0059813 A1 | 3/2004 | Bolder et al. | |
| 2004/0073890 A1 | 4/2004 | Johnson et al. | |
| 2004/0093518 A1* | 5/2004 | Feng et al. | 713/201 |
| 2004/0139175 A1 | 7/2004 | Lin | |

* cited by examiner

*Primary Examiner* — Beemnet Dada
(74) *Attorney, Agent, or Firm* — Jeff Tang; Hoffman Warnick LLC

(57) ABSTRACT

The present invention allows changes to access control settings for a computer-based resource to be detected and stored in a set (e.g., one or more) of electronic documents. In a typical embodiment each stored change includes a previous access control setting and a new access control setting so that the precise differences resulting from changes can be known. In addition, in the event of an access control condition such as an undesired security risk or undesired security restriction, the history of changes maintained in the set of documents can be consulted, and a previous version of access control settings can be reverted to.

13 Claims, 2 Drawing Sheets

METHOD, SYSTEM AND PROGRAM PRODUCT FOR VERSIONING ACCESS CONTROL SETTINGS

BACKGROUND OF THE INVENTION

1. Field of the Invention

The present invention generally relates to versioning of access control settings for a computer-based resource (e.g., a computer file, a hardware system, a software system, etc.). Specifically, the present invention provides a way to document changes to access controls settings so that previous versions of access control settings can be reverted to if necessary.

2. Related Art

As computer infrastructures become more sophisticated and widespread, a greater need for increased security has been recognized. Traditionally, security is provided in the form of access control settings or permissions, whereby the extent of users' access to various resources is set forth. For example, in a company, certain users may have read only privileges for a file, other users may have read/write privileges, while still other users may have no access privileges at all. From time to time, changes are made to access control settings.

Unfortunately, such changes often raise issues of one form or another. For example, a change to an access control setting giving a certain permission to an entire group of users may be overly broad and cause an undesired security risk. Conversely, a change to an access control setting could be overly narrow and cause an undesired security restriction on one or more users.

To date no system has been proposed that keeps track of a history of changes to access control settings for computer-based resources. To this extent, no existing system identifies the previous and new access control settings that resulted from each change. Still yet, no existing system allows a previous access control setting to be reverted to in the event an access control condition (e.g., undesired risk or undesired restriction) results from a change.

In view of the foregoing, there exists a need for a computer-implemented method, system, and program product for versioning access control settings.

SUMMARY OF THE INVENTION

In general, the present invention provides a computer-implemented method, system and program product for versioning access control settings. Specifically, the present invention allows changes to access control settings for a computer-based resource to be detected and stored in a set (e.g., one or more) of electronic documents. In a typical embodiment each stored change includes a previous access control setting and a new access control setting so that the precise differences resulting from changes can be known. In addition, in the event of an access control condition such as an undesired security risk or undesired security restriction, the history of changes maintained in the set of documents can be consulted, and a previous version of access control settings can be reverted to.

A first aspect of the present invention provides a computer-implemented method for versioning access control settings, comprising: detecting changes to access control settings for a computer-based resource; and storing the changes in a set of documents, wherein the set of documents contains a history of changes to the access control settings for the computer-based resource.

A second aspect of the present invention provides a system for versioning access control settings, comprising: a system for detecting changes to access control settings for a computer-based resource; and a system for storing the changes in a set of documents, wherein the set of documents contains a history of changes to the access control settings for the computer-based resource.

A third aspect of the present invention provides a program product stored on a computer useable medium for versioning access control settings, the computer useable medium comprising program code for causing a computer system to perform the following steps: detecting changes to access control settings for a computer-based resource; and storing the changes in a set of documents, wherein the set of documents contains a history of changes to the access control settings for the computer-based resource.

A fourth aspect of the present invention provides a method for deploying an application for versioning access control settings, comprising: providing a computer infrastructure being operable to: detect changes to access control settings for a computer-based resource; and store the changes in a set of documents, wherein the set of documents contains a history of changes to the access control settings for the computer-based resource.

A fifth aspect of the present invention provides a computer software embodied in a propagated signal for versioning access control settings, the computer useable medium comprising instructions for causing a computer system to perform the following: detect changes to access control settings for a computer-based resource; and store the changes in a set of documents, wherein the set of documents contains a history of changes to the access control settings for the computer-based resource.

Therefore, the present invention provides a computer-implemented method, system and program product for versioning access control settings.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a computer-implemented method, system and program product for versioning access control settings. Specifically, the present invention allows changes to access control settings for a computer-based resource to be detected and stored in a set (e.g., one or more) of electronic documents. In a typical embodiment each stored change includes a previous access control setting and a new access control setting so that the precise differences resulting from changes can be known. In addition, in the event of an access control condition such as an undesired security risk or undesired security restriction, the history of changes maintained in the set of documents can be consulted, and a previous version of access control settings can be reverted to.

Figure 1:
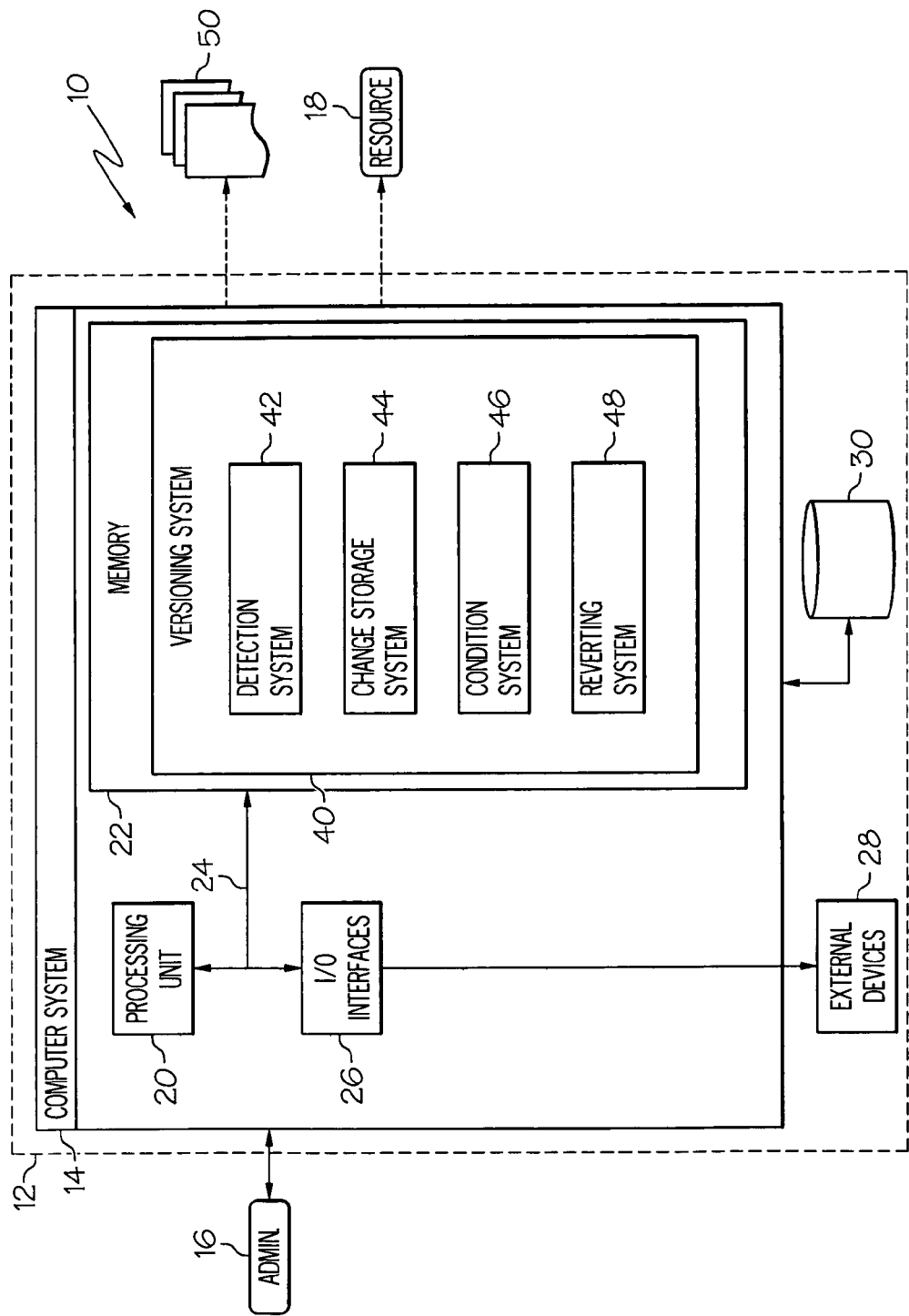
FIG. 1 shows an illustrative system for versioning access control settings according to the present invention.

Referring now to FIG. 1, a system 10 for versioning access control settings for a computer-based resource (hereinafter resource 18) according to the present invention is shown. Specifically, FIG. 1 depicts a system 10 in which changes to access control settings for resource 18 can be stored in a set (one or more) of documents 50. In general, resource 18 can be any type of resource now known or later developed. For example, resource 18 could be an electronic file, a software system (e.g., an application), a hardware system, etc. In addition, set of documents 50 are typically electronic documents such as Extensible Access Control Markup Language (XACML) documents.

In any event, as depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to version access control settings.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as versioning system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention, such as access control settings, documents 50, etc., etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is versioning system 40, which includes detection system 42, change storage system 44, condition system 46, and reverting system 48. Assume in an illustrative embodiment that administrator 16 made a change to the access control settings for resource 18. For example, assume that administrator 16 gave read/write permissions to an entire group of users for resource 18. Further assume that this was a change from the previous access control settings for resource 18. Under the present invention, detection system 42 will detect the changes to access control settings made by administrator 16 (or some other party). Such detection can be based on any practice now known or later developed. For example, the changes could be detected based on an analysis of the input by administrator 16, a comparison of the access control settings given by administrator 16 to previous access control settings, etc. (e.g., in set of documents 50). Regardless, once the changes are detected, they will be stored by change storage system 44 in set of documents 50.

As indicated above, set of documents 50 comprises XACML documents in a typical embodiment of the present invention. Access control settings for a single resource such as resource 18 could be stored in a single document 50, or in multiple documents 50. Along these lines, the changes could be stored as previous access control settings and new access control settings for resource 18. As will be further described below, this allows the exact changes that were made to be readily apparent. This also allows set of documents 50 to contain a complete history of changes to the access control settings for the resource 18. For example, the current change made by administrator 16 might be the fourth such change for resource 18. Set of documents 50 will typically include each previous change as well as the current change.

Once the changes have been made, access to resource 18 will be controlled according to the new settings. Assume that at some point in time later, an access control condition resulted. Such a condition could be that an undesired security risk such as a user getting more privileges to resource 18 than which he/she is entitled. Alternatively the condition could be an undesired security restriction such as a user being restricted from having the access to resource 18 which he/she is entitled. In this example, assume that the condition is an undesired security risk such as a member of the group being granted read/write privileges when that user should only have read privileges for resource 18. The condition will be detected by condition system 46. Such detection could happen in any number of ways. For example, administrator 16 could manually alert condition system 46 of the condition. Alternatively, condition system 46 could automatically detect the condition when the changes are made by comparing the changes to a policy, access control list or the like. In any event, the present invention allows a previous version of the access control settings to be reverted to. Specifically, using set of documents 50, administrator 16 can see the changes that results in the condition. Administrator 16 can also see all previous versions of the access control settings, and revert to a previous version that did not result in an access control condition. In one embodiment, administrator 16 can select a previous version of access control settings from set of documents 50, and such selection will be received by reverting system 48. This will cause the selected previous version to be "activated" for resource 50. Thus, overriding the most recent change, and addressing the resulting access control condition.

Figure 2:
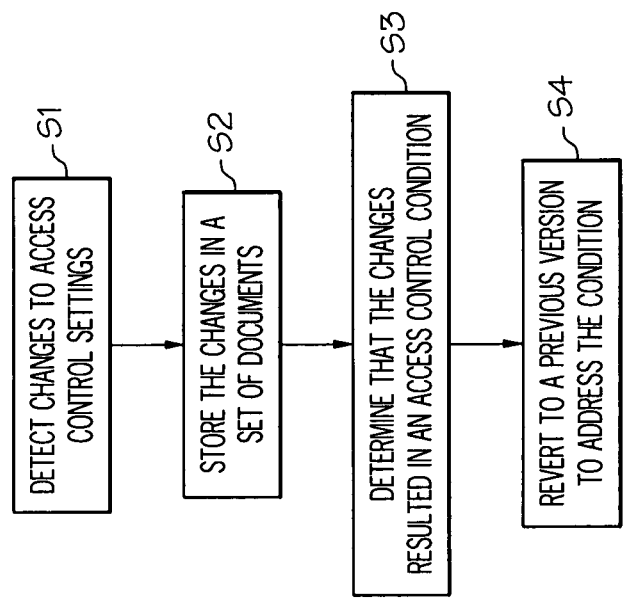
FIG. 2 shows a method flow diagram according to the present invention.

Referring now to FIG. 2, a method flow diagram according to the present invention is shown. As depicted, first step S1 is to detect changes to access control settings for a computer-based resource. Second step S2 is to store the changes in a set of documents. As indicated above, the set of documents contains a history of changes to the access control settings for the computer-based resource. In third step S3 it is determined that the changes have resulted in an access control condition. In fourth step S4, a previous version of the access control settings, as identified in the history of changes, is reverted to so that the access control condition can be addressed.

While shown and described herein as a method and system for versioning access control settings, it is understood that the invention further provides various alternative embodiments. For example, in one embodiment, the invention provides a computer-readable/useable medium that includes computer program code to enable a computer infrastructure to version access control settings. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to version access control settings. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for versioning access control settings. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for versioning access control settings, comprising:
    detecting, using a computer device, changes to access control settings made by an administrator for a computer-based resource, wherein the changes to access control settings creates new access control settings;
    storing, in response to the detecting changes to access control settings, using the computer device, the new access control settings in a set of documents, wherein at least one set of previous access control settings is maintained, wherein the set of documents contains a history of changes to the access control settings for the computer-based resource, and wherein the history of changes includes at least one set of previous access control settings and, as a result of the storing, the new access control settings;
    detecting, in response to the detecting the changes to access control settings, an access control condition, wherein the access control condition is an undesired change in the access control setting for at least one user; and
    reverting, in response to the detecting the access control condition, to the at least one set of previous access control settings.

2. The method of claim 1, wherein the access control condition comprises an undesired security risk.

3. The method of claim 1, wherein the access control condition comprises an undesired security restriction.

4. The method of claim 1, wherein the set of documents comprises at least one Extensible Access Control Markup Language (XACML) document.

5. A system for versioning access control settings, comprising:
a computer hardware device including:
a system for detecting changes to access control settings made by an administrator for a computer-based resource, wherein the changes to access control settings creates new access control settings;
a system for storing, in response to the detecting changes to access control settings, the new access control settings in a set of documents, wherein at least one set of previous access control settings is maintained, wherein the set of documents contains a history of changes to the access control settings for the computer-based resource, and wherein the history of changes includes at least one set of previous access control settings and, as a result of the storing, the new access control settings;
a system for detecting, in response to the detecting the changes to access control settings, an access control condition, wherein the access control condition is an undesired change in the access control setting for at least one user; and
a system for reverting, in response to the detecting the access control condition, to the at least one set of previous access control settings.

6. The system of claim 5, wherein the access control condition comprises an undesired security risk.

7. The system of claim 5, wherein the access control condition comprises an undesired security restriction.

8. The system of claim 5, wherein the set of documents comprises at least one Extensible Access Control Markup Language (XACML) document.

9. A program product stored on a computer readable storage non-transitory medium for versioning access control settings, the computer readable storage medium comprising program code for causing a computer system to perform the following steps:
detecting changes to access control settings made by an administrator for a computer-based resource, wherein the changes to access control settings creates new access control settings;
storing, in response to the detecting changes to access control settings, the new access control settings in a set of documents, wherein at least one set of previous access control settings is maintained, wherein the set of documents contains a history of changes to the access control settings for the computer-based resource, and wherein the history of changes includes at least one set of previous access control settings and, as a result of the storing, the new access control settings;
detecting, in response to the detecting the changes to access control settings, an access control condition, wherein the access control condition is an undesired change in the access control setting for at least one user; and
reverting, in response to the detecting the access control condition, to the at least one set of previous access control settings.

10. The program product of claim 9, wherein the access control condition comprises an undesired security risk.

11. The program product of claim 9, wherein the access control condition comprises an undesired security restriction.

12. The program product of claim 9, wherein the set of documents comprises at least one Extensible Access Control Markup Language (XACML) document.

13. A method for deploying an application for versioning access control settings, comprising:
providing a computer infrastructure comprising a device being operable to:
detect changes to access control settings made by an administrator for a computer-based resource, wherein the changes to access control settings creates new access control settings;
store, in response to the detect changes to access control settings, the new access control settings in a set of documents, wherein at least one set of previous access control settings is maintained, wherein the set of documents contains a history of changes to the access control settings for the computer-based resource, and wherein the history of changes includes at least one set of previous access control settings and, as a result of the storing, the new access control settings;
detect, in response to the detect the changes to access control settings, an access control condition, wherein the access control condition is an undesired change in the access control setting for at least one user; and
revert, in response to the detect the access control condition, to the at least one set of previous access control settings.

* * * * *